United States Patent [19]

Stroup, Jr.

[11] Patent Number: 5,143,268
[45] Date of Patent: Sep. 1, 1992

[54] FLAT TUBE CUTTING TECHNIQUES

[75] Inventor: Steven L. Stroup, Jr., Bluffton, Ind.

[73] Assignee: Crown Unlimited Machine, Inc., Bluffton, Ind.

[21] Appl. No.: 731,455

[22] Filed: Jul. 17, 1991

[51] Int. Cl.⁵ .............................................. B26F 3/00
[52] U.S. Cl. ..................................... 225/2; 225/96.5; 225/101
[58] Field of Search ................. 225/2, 96, 96.5, 100, 225/101, 103, 105

[56] References Cited

U.S. PATENT DOCUMENTS

| | | |
|---|---|---|
| 3,568,488 | 3/1971 | Franks ............................... 225/2 X |
| 3,692,219 | 9/1972 | Franks ................................... 225/2 |
| 3,757,627 | 9/1973 | Lange ............................... 225/103 X |
| 4,111,346 | 9/1978 | Bertolette ........................... 225/96.5 |
| 4,226,352 | 10/1980 | Watson ................................ 225/100 |
| 4,910,991 | 3/1990 | Bertolette et al. ................. 225/2 X |

Primary Examiner—Douglas D. Watts
Assistant Examiner—Eugenia A. Jones
Attorney, Agent, or Firm—Pearne, Gordon, McCoy & Granger

[57] ABSTRACT

Method and apparatus is disclosed for severing flat tubing. The method involves the steps of clamping a length of tubing, deeply scoring the tubing on opposite sides and applying a high impact axial force to sever the tube.

6 Claims, 10 Drawing Sheets

FLAT TUBE CUTTING TECHNIQUES

BACKGROUND OF THE INVENTION

This invention relates to tube cutting devices and, more particularly, to a method and apparatus for separating flat heat exchanger tubing into predetermined lengths having substantially burr-free parted ends.

Conventional heat exchanger tubing is fabricated from thin-walled copper pipe, which is bent in a serpentine pattern and provided with heat exchanging fins. It has long been recognized that care must taken in cutting the tubing to minimize the formation of radially inwardly projecting burrs which are formed by the cutting tools. Typically, the tubing is cut by orbiting a cutting tool about the circumference of the tubing while moving the cutter inwardly.

Various mechanisms have been proposed to minimize formation of burrs on such tubing. One such device is disclosed in U.S. Pat. No. 3,568,488 to Franks. According to the Franks patent, a tube is tightly gripped and placed under tension and while the tube is tensioned, a cutting tool makes an annular cut in the periphery of the tube which penetrates into the wall of the tube. With the tension applied to the tube, the tensile strength of the tube wall not yet severed is exceeded and the tube breaks. Consequently, the tube material is not cut entirely through, but partially cut and partially pulled apart at the cutting point. Therefore, the inwardly extending burr is minimized by the extruding caused by the pulling apart action. Other examples of tube cutting techniques may be found in U.S. Pat. Nos. 4,235,137; 4,112,294; and 3,692,219.

A recent development in heat exchange tubing involves the provision of extruded flat tubing made from aluminum. The flat tubing has flat, parallel faces and rounded ends to define a flat, narrow interior channel. The interior channel is separated into a plurality of axially extending internal chambers defined by parallel walls extending perpendicularly between the flat walls of the tube. This arrangement provides a large surface area to the liquid flowing through the tube. Since the walls defining the internal chambers are so closely spaced, it is imperative that the severed ends of the tubing be substantially burr-free so that the burrs do not block the passages and do not interfere with an edge-to-edge tube joining operation or other operation involving the connection of the tube to a fluid source.

SUMMARY OF THE INVENTION

Conventional tube parting techniques cannot be employed successfully in operations involving the severing of flat heat exchanging tubing. Obviously, orbiting cutters are not easily adapted to sever flat tubing. Furthermore, the application of tensile forces sufficient to part the tubing during or after a cutting operation results in axially extending burrs since the aluminum alloy is a soft material and tends to exhibit substantial elongation between its elastic limit and its ultimate yield point.

This invention provides a separated length of flat aluminum heat exchanger tubing by applying clamping pressure to the tubing at spaced apart locations and deeply scoring lines of equal depth on opposite faces of the tubing with each line being in a plane normal to the longitudinal axis of the tubing. The scoring operation is conducted between the clamped portions of the tube. A high impact force is applied along the longitudinal axis of the tube in a direction away from the score lines by applying the impact force to one of the tube grippers. The magnitude of the impact force is sufficient to fracture the tube along the lines without any substantial elongation or cold flow of the metal. According to a preferred aspect of this invention, the score lines are of equal depth and correspond to one-half to two-thirds of the total thickness of each flat tube wall.

DETAILED DESCRIPTION OF THE INVENTION

Figure 1:
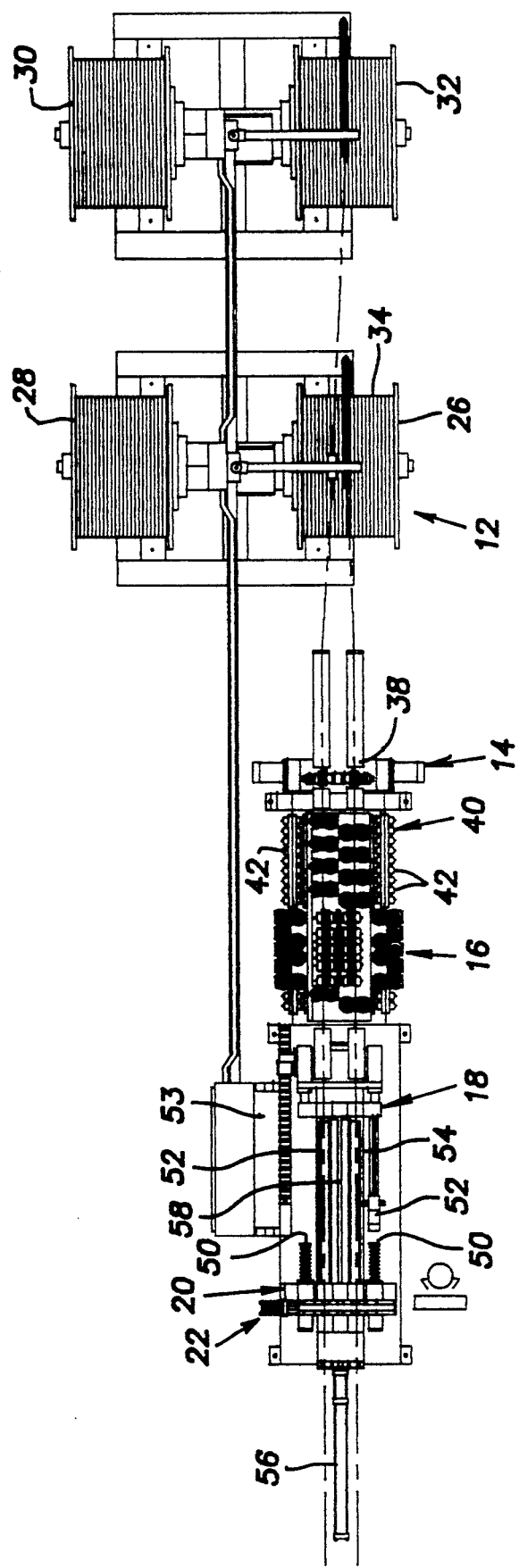
FIG. 1 is an elevational view of a machine for separating lengths of flat metal tubing according to this invention.
Figure 2:
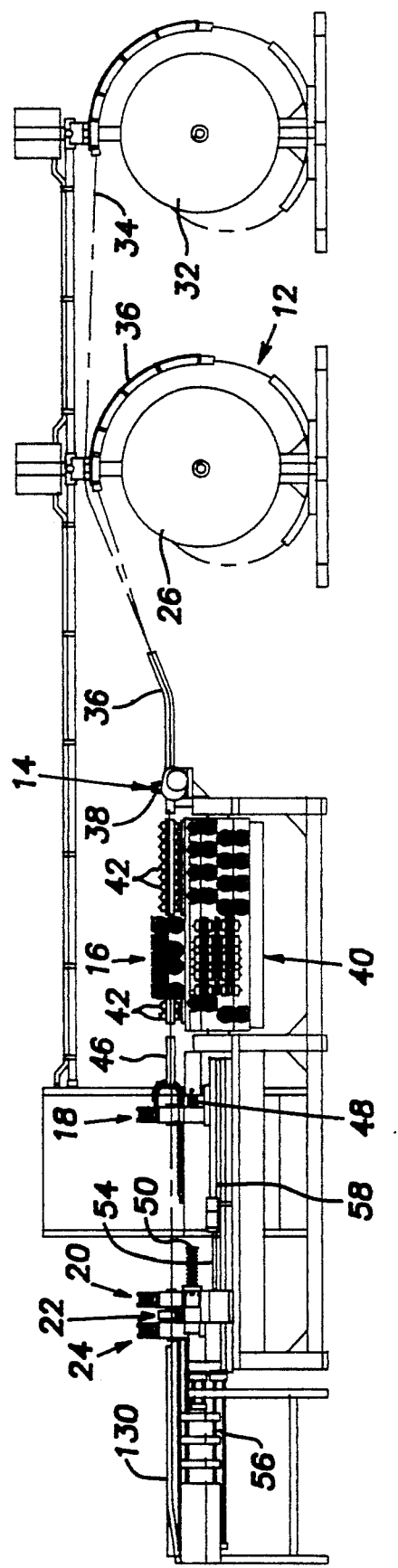
FIG. 2 is a plan view of the machine illustrated in FIG. 1.
Figure 3:
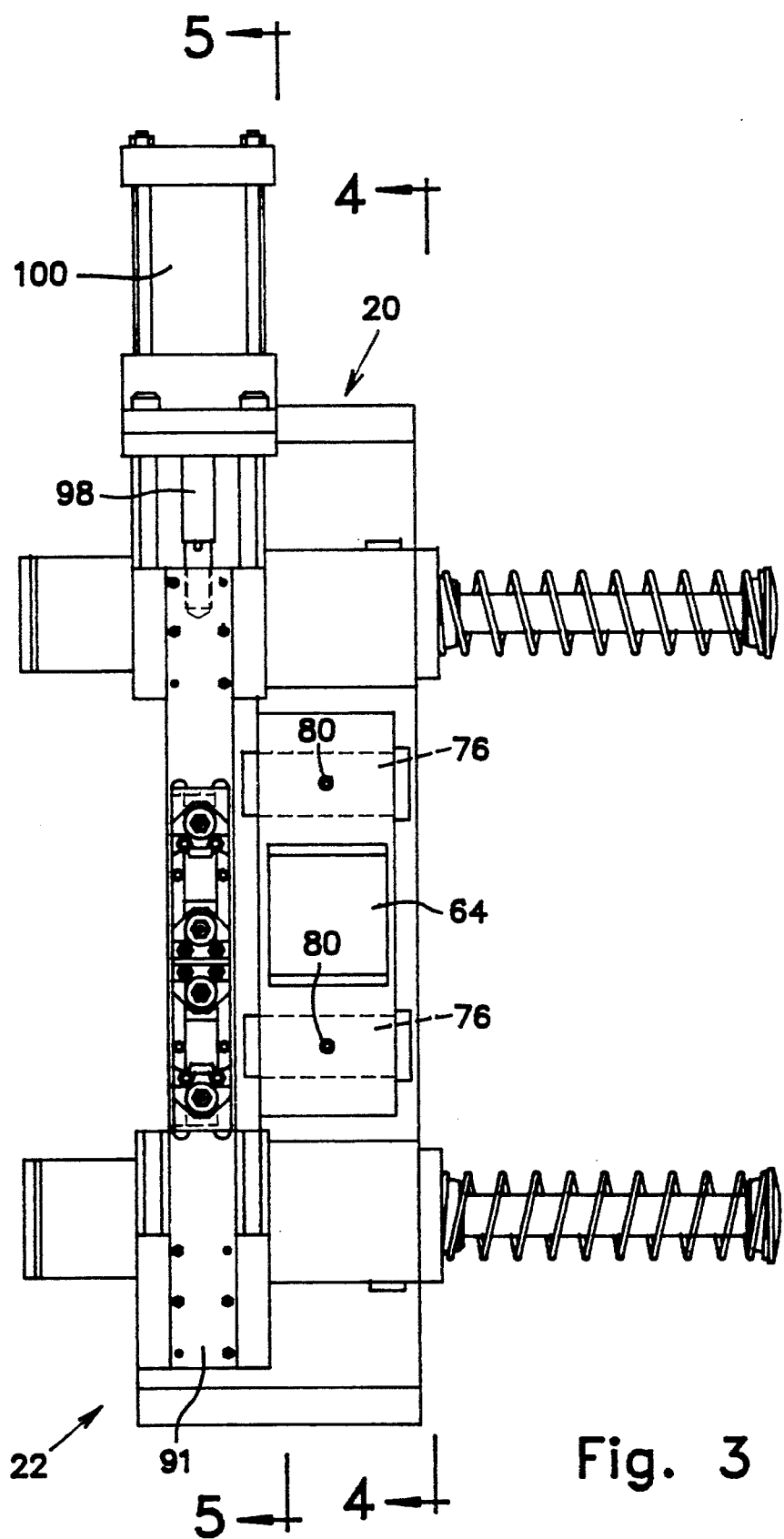
FIG. 3 is a plan view of the scoring head portion of the machine.
Figure 3A:
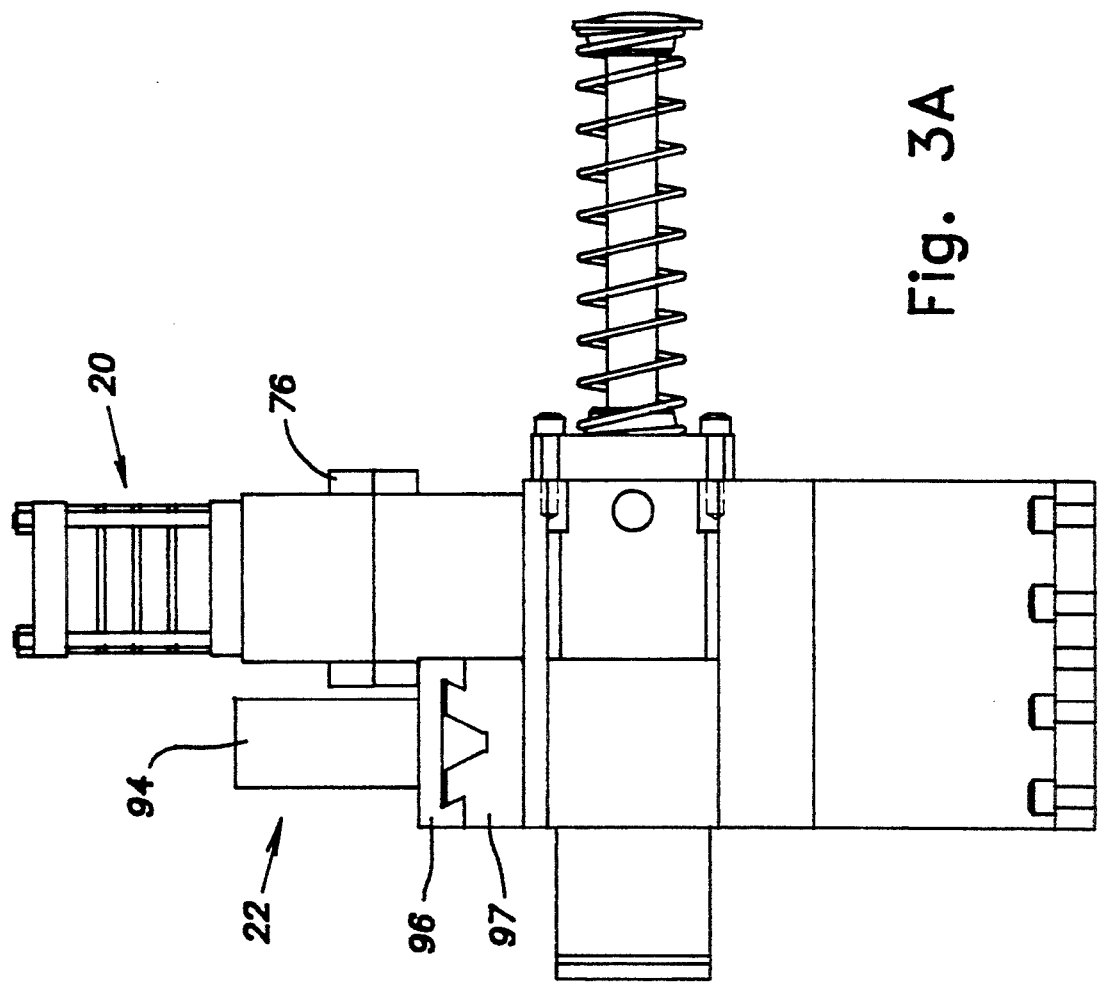
FIG. 3A is an elevational view of the portion illustrated in FIG. 3.

Referring now to the drawings, and particularly to FIGS. 1 and 2, there is illustrated an apparatus 10 for separating an indeterminate length of flat metal tubing into predetermined lengths. The apparatus 10 includes a conventional uncoiler assembly 12, which uncoils the stock upon demand, a stock feed roller assembly 14, a straightening and sizing assembly 16, a clamping assembly 18 for incrementally feeding the stock, a clamping assembly 20 for stabilizing the stock during a scoring and parting operation, a scoring assembly 22, and a clamping assembly 24 for parting the stock by impact.

As may be noted, the stock uncoiler assembly includes spool mounts 26, 28, 30, and 32 having coiled flat tubing 34 wound thereon. The spool mounts 26 and 32 are in an active working position to feed tubing 34 to the powered feed station 14. The spool mounts 28 and 30 are in a stand-by, ready position.

The tubing 34 is fed through guide tubes 36 to the feed roller assembly 14 which includes feed rollers 38.

From the feed rollers the tubing 34 is laced through the straightening and sizing assembly 16. The straightening and sizing assembly 16 is a conventional device which includes a turret 40 having tooling fixtures or rollers 42 on each face so that the turret 40 may be positioned to accommodate tubing of different widths and thickness.

The tubing 34 is fed through a guide 46 to the clamping assembly 18 which is similar to the clamping assemblies 20 and 24 and the clamping function of those assemblies will be described in greater detail.

The clamping assembly 18 is adapted to grip the tubing 34 and advance a length of the tubing through the clamping assemblies 20 and 24 a distance which corresponds to the distance between adjustable stops 48 and 50. As will become apparent, the distance between the stops 48 and 50 corresponds to the desired axial extent of the tubing. A linear actuator 52 is preset to this desired length and the linear actuator establishes the position of the stop 48 for accurate length control.

The clamping assembly 18 is mounted on guide rods 53 and 54 and the assembly 18 is reciprocated by a feed cylinder 56 having a piston rod 58 fixed to the assembly 18. Reciprocation of the assembly 18 toward the assembly 20, and with the assembly 18 in a clamped condition, the assembly 18 axially advances a pair of parallel tubing lengths through the assemblies 20 and 24 which are in an unclamped condition and through the interposed scoring assembly 22. When the assembly 18 is fully advanced against the stops 50, the clamp 18 is released and the assembly 18 is returned to its illustrated position. Prior to the release of the clamping assembly 18 and while the assembly 18 is against its stop 50, the clamping assemblies 20 and 24 are actuated to firmly grip the tubing 34. Since the assemblies 18, 20 and 24 are substantially identical, the assembly 20 will be described herein as representative of the other clamping assemblies.

Figure 4:
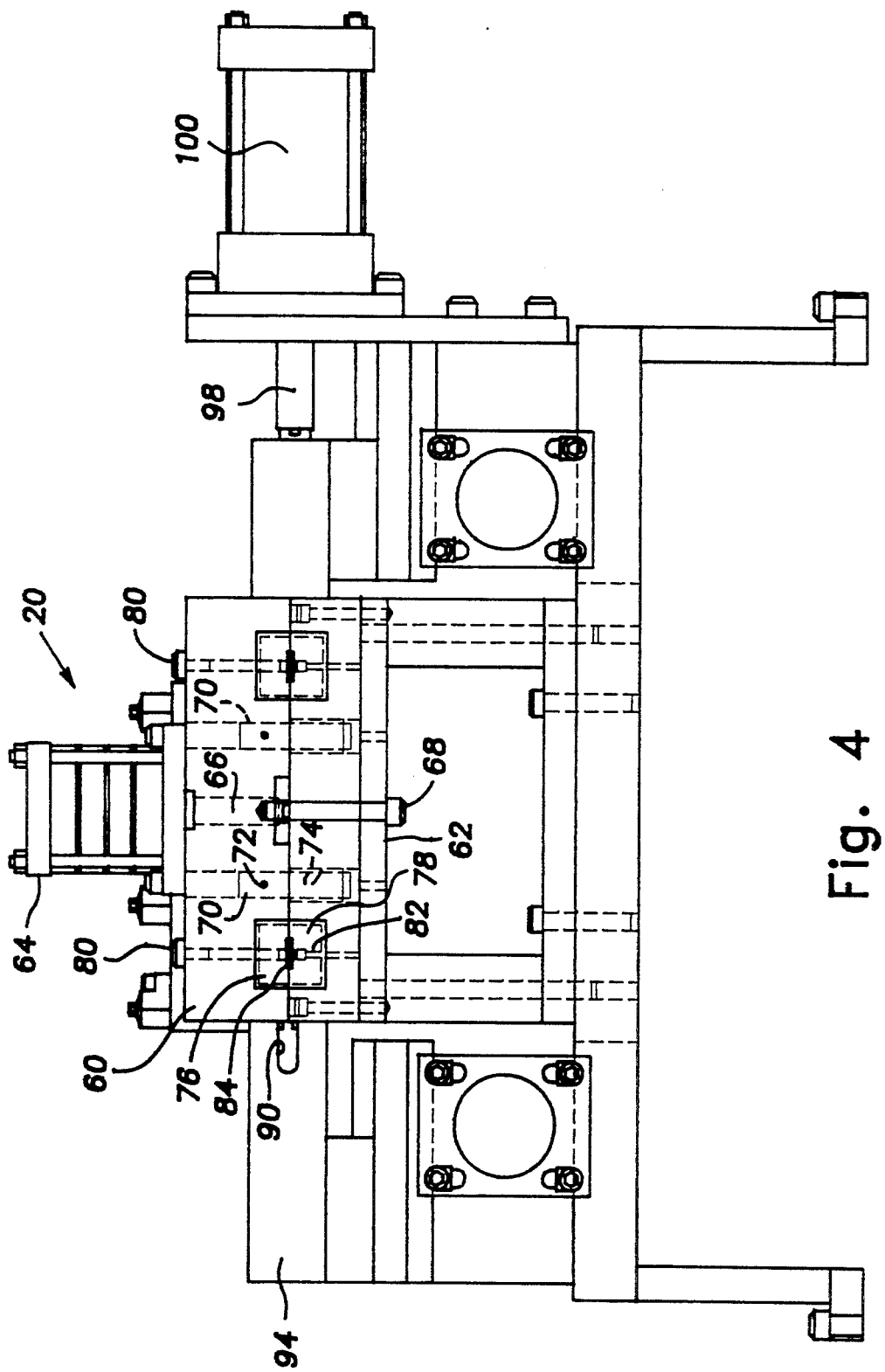
FIG. 4 is a cross sectional view, the plane of the section being indicated by the line 4—4 in FIG. 3.

The clamping assembly 20 (FIG. 4) includes a fixed upper platen 60 and a movable lower platen 62. The upper platen 60 has a pneumatic power cylinder 64 mounted thereon and the cylinder 64 has a piston rod 66 slidably projecting through the platen 60. A fastening bolt 68 extends through the movable platen 62 and into the rod 66 so that the movable platen 62 may be released from its illustrated closed clamping position. During such movement, the lower platen 62 is guided by rods 70 fixed in the upper platen 60 by set screws 72 and received in guide bores 74 in the platen 62. The platens 60 and 62 are provided with upper and lower die sets 76 and 78, respectively. The upper die sets are retained by fasteners 80 and the lower die sets are fixed by fasteners 82. Each die set 76 and 78 cooperate to define a clamping opening 84 which has a cross section corresponding to the cross section of the tubing 34 to establish a slight interference fit with the tubing as the die sets 76 and 78 cooperate to clamp the tubing.

With the clamping assemblies 20 and 24 securely holding the length of tubing advanced by the assembly 18, the tubing is scored or cut according to the following procedure. The scoring assembly 22 is interposed between the assemblies 20 and 24 so that the tubing projects through elongated apertures 90 and 92 in a beam 94. The beam 94 is mounted on a guide block 96 which cooperates with a dovetail block 97. One end of the beam 94 is fixed to a piston rod 98 associated with a power cylinder 100 which is adapted to shift the position of the beam 94 from its illustrated position to a position adjacent the cylinder 100.

Figure 8:
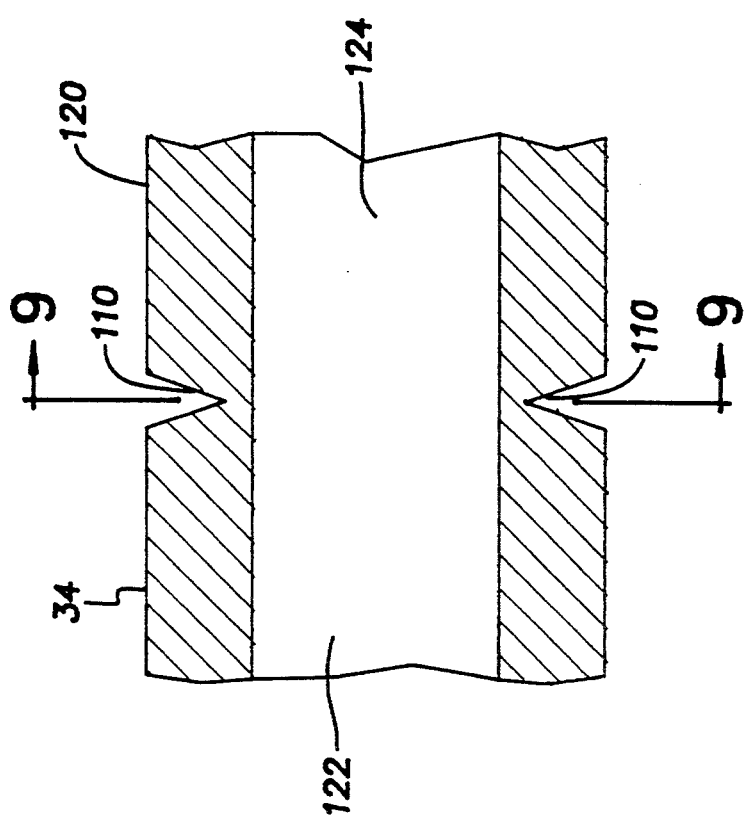
FIG. 8 is an enlarged cross sectional view of the flat tubing showing the score lines in the tubing prior to separation.

Upper and lower circular cutting or scoring blades 102 and 104, respectively, are mounted on the beam 94 so that they project into the apertures 90 and 92. Each cutter 102 is rotatably mounted on a vertically adjustable yoke 105 so that the spacing between the cutters 102 and 104 may be adjusted by a threaded shaft 106. BY shifting the beam 94 from its illustrated position to a position adjacent the power cylinder 100, the cutters deeply score lines or notches 110 (FIG. 8) of equal depth on opposite faces of the tubing 34. Each line 110 is in a plane normal to the longitudinal axis of the length of the tubing 34. The lines 110 are preferably one-half to two-thirds of the thickness of the faces of the tubing 34. The score lines should be deep, narrow, well-defined notches and the cutters 102 and 104 are preferably fabricated from 400 series surgical-grade stainless steel with cutting edges that define a total included angle of about 15°.

Figure 9:
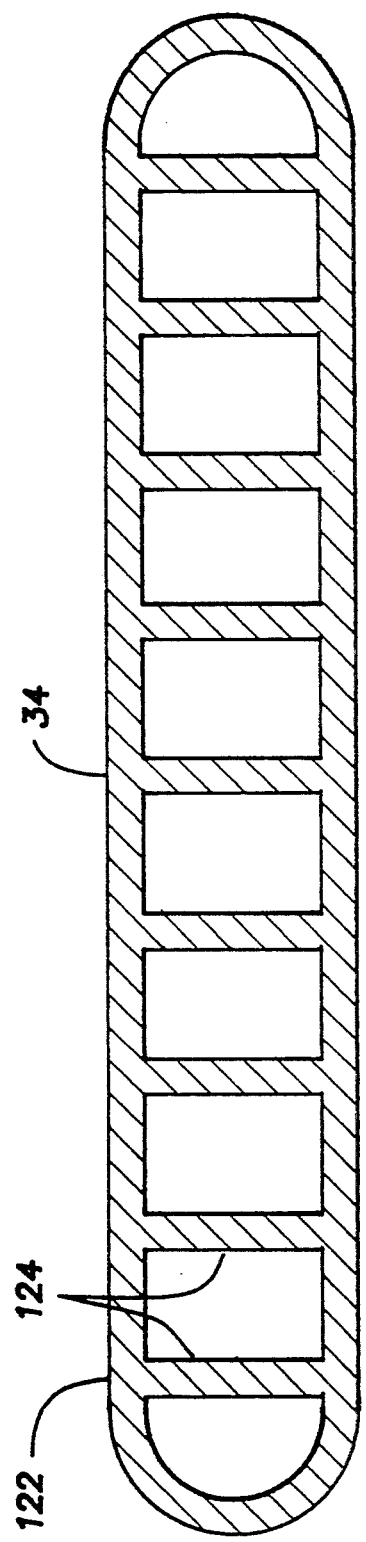
FIG. 9 is a cross sectional view, the plane of the section being indicated by the line 9—9 in FIG. 7.

As may be noted in FIG. 9, the tubing 34 includes parallel faces 130 and a plurality of internal chambers 122 defined by parallel longitudinal walls 124.

Figure 5:
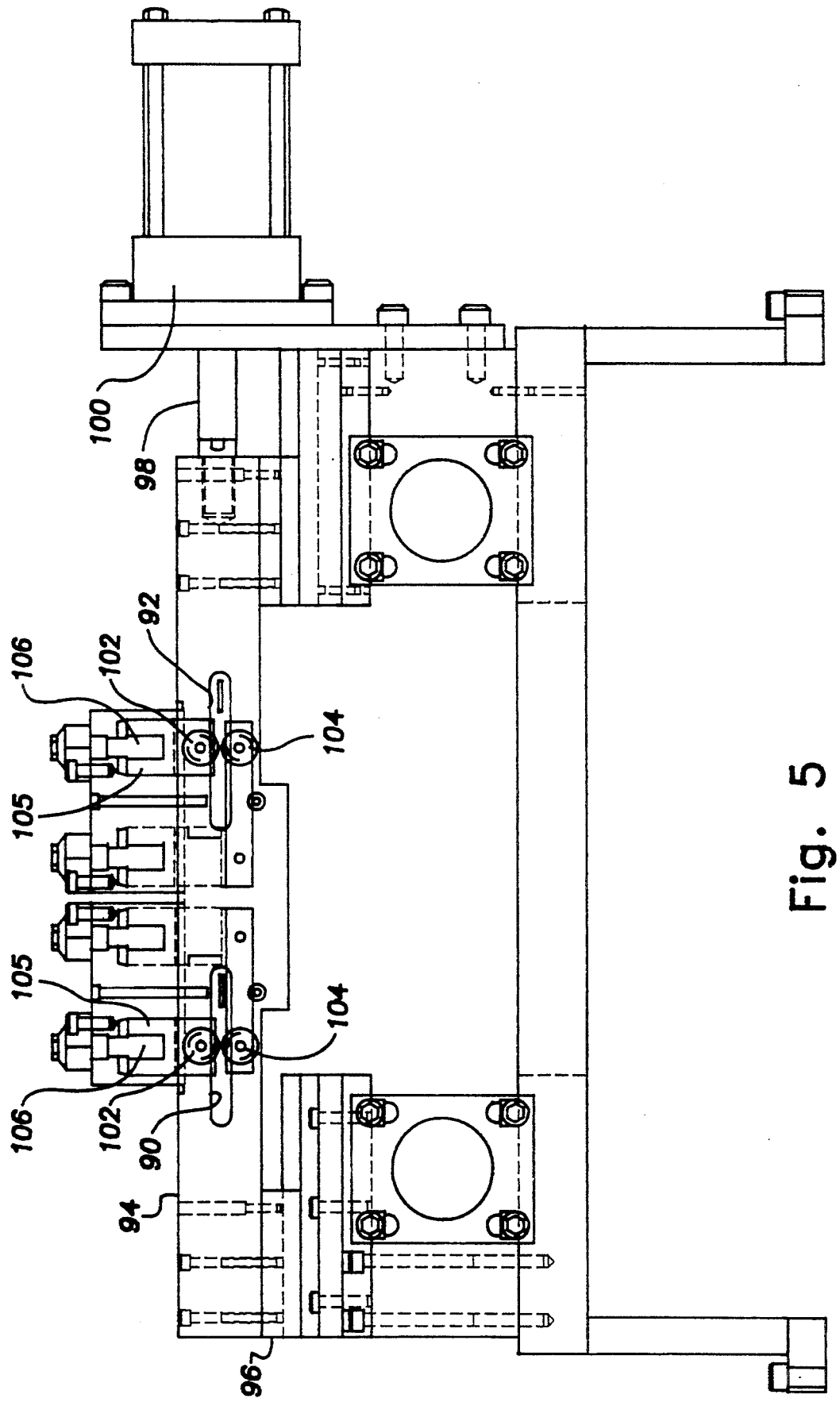
FIG. 5 is a cross sectional view, the plane of the section being indicated by the line 4—4 in FIG. 3
Figure 6:
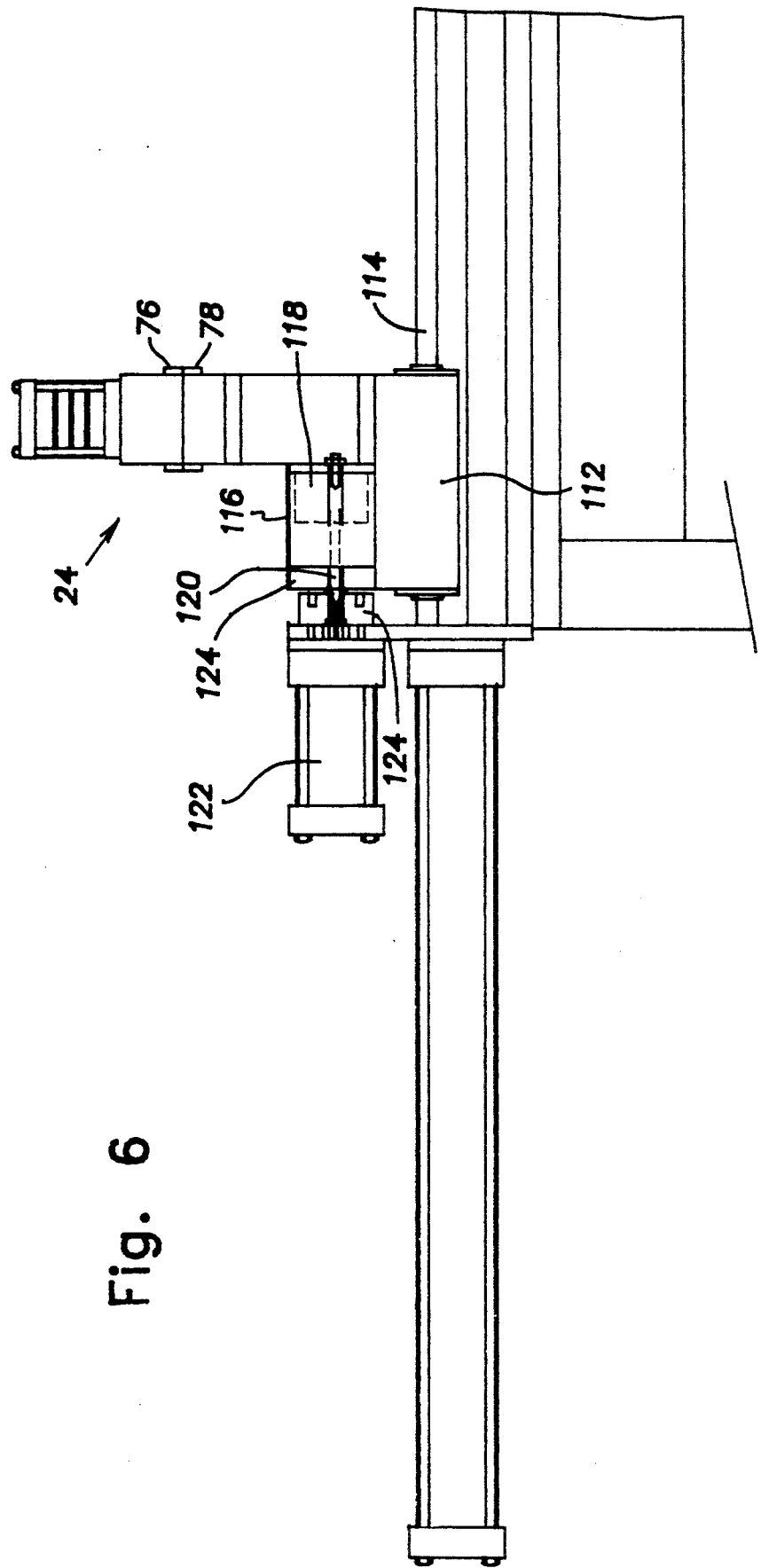
FIG. 6 is an elevational view of a tension clamp and an impact unit associated with that clamp.
Figure 7:
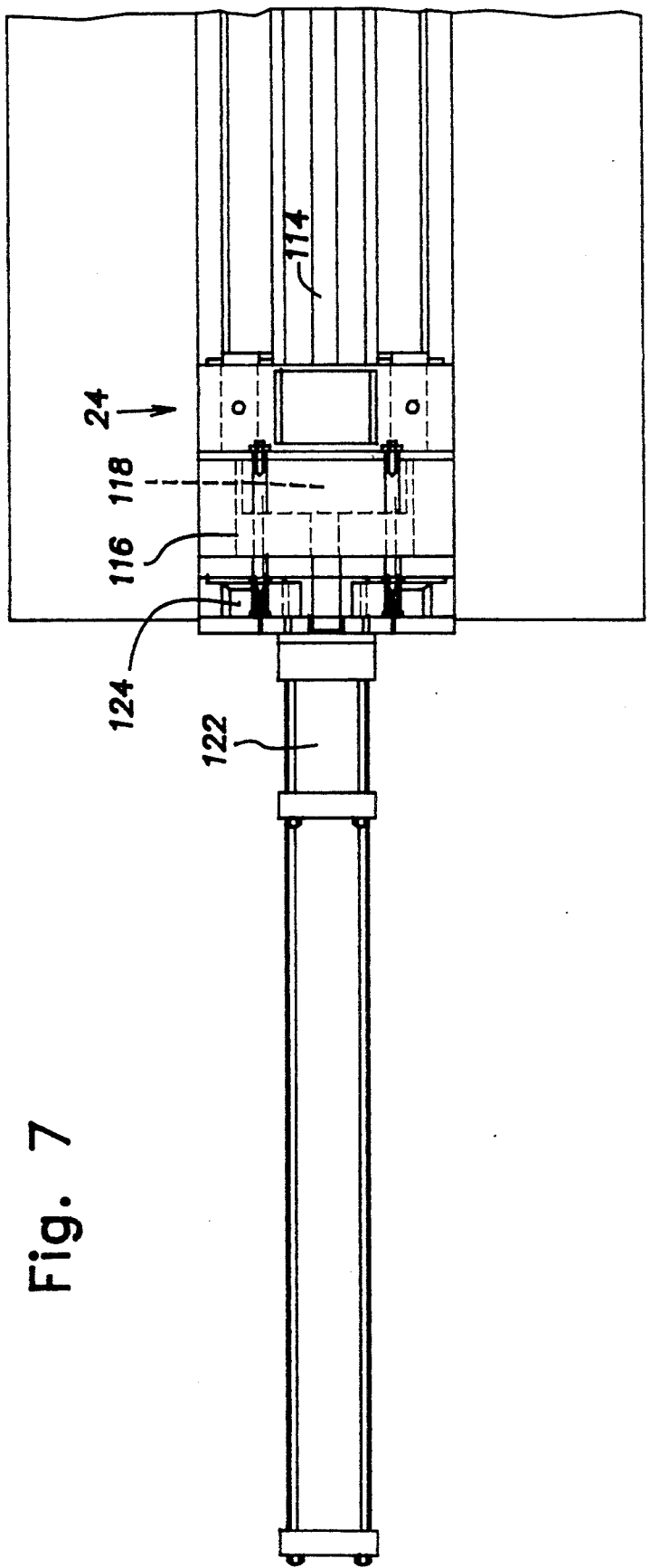
FIG. 7 is a plan view of the unit illustrated in FIG. 5.

After the tubing has been scored in this manner and while the clamping assemblies 20 and 24 retain their grip on the tubing, the tubing is parted in the following manner. Referring to FIGS. 6 and 7, the assembly 24 further includes a base 112. An anvil 118 is mounted within the cylinder 116 and is carried by a piston rod 120 which projects from a pneumatically operated power cylinder 122. Severing impact is applied to the tubing 34 by actuating the cylinder 122 to rapidly retract the piston rod 120 so that the anvil 118 strikes a wall 124 of the cylinder 116 to quickly move the entire assembly 24 to the left as viewed in FIG. 5 and against a cushioning mechanism. The sharp impact on the assembly 24 fractures the tubing 34 in a burr-free manner since the tubing is not able to elongate as it would if a steady tensile force were applied to the tubing. The assembly 24 releases the severed tubing and the tubing is deposited on a collection table 130. The assembly 20 also releases its grip on the tubing and the tubing is incrementally advanced through the assemblies 20, 22, and 24 so that the operation may be repeated.

Although the preferred embodiment of this invention has been shown and described, it should be understood that various modifications and rearrangements of the parts may be resorted to without departing from the scope of the invention as disclosed and claimed herein.

What is claimed is:

1. A method of separating an indeterminate length of metal tubing into predetermined lengths having substantially burr-free parted ends comprising the steps of providing a length of hollow flat tubing having substantially flat faces and rounded edges, applying clamping pressure to said tubing at spaced apart locations by first and second gripping means, deeply scoring lines of equal depth on opposite faces of said tubing with each line being in a plane normal to a longitudinal axis of said length of tubing, applying a high impact force along said longitudinal axis and in a direction away from said lines by sharply striking one of said gripping means with a high impact force, the magnitude of said force being sufficient to fracture said tube along said line without any substantial elongation or cold flow of said metal.

2. A method according to claim 1 wherein said force is applied to said second gripping means.

3. A method according to claim 1 wherein said metal is aluminum.

4. A method according to claim 1 wherein said tubing is axially fed to said first and second gripping means by third gripping means.

5. A method according to claim 1 wherein said tubing has a plurality of axially extending internal chambers defined by parallel wall extending between said flat faces and said score lines extend to a depth substantially corresponding to one-half to two-thirds of the thickness of said faces.

6. Apparatus for separating an indeterminate length of metal tubing into predetermined lengths having substantially burr-free parted ends comprising means for feeding a length of hollow, oval tubing having substantially flat faces and rounded edges to first and second gripping means, said first and second gripping means being axially spaced apart, scoring means interposed between said gripping means and adapted to deeply score lines of equal depth on opposite faces of said tubing with each line being in a plane normal to a longitudinal axis of said length of tubing, means to apply a high impact force along said longitudinal axis and in a direction away from said lines by sharply striking one of said gripping means with a high impact force, the magnitude of said force being sufficient to fracture said tube along said line without any substantial elongation or cold flow of said metal.

* * * * *

UNITED STATES PATENT AND TRADEMARK OFFICE
CERTIFICATE OF CORRECTION

PATENT NO. : 5,143,268

DATED : September 1, 1992

INVENTOR(S) : Steven L. Stroup, Jr.

It is certified that error appears in the above-identified patent and that said Letters Patent is hereby corrected as shown below:

Column 4, line 59, "wall" should read --walls--.

Signed and Sealed this

Fourteenth Day of December, 1993

Attest:

BRUCE LEHMAN

*Attesting Officer*     *Commissioner of Patents and Trademarks*